(12) United States Patent
Young et al.

(10) Patent No.: US 12,319,180 B2
(45) Date of Patent: Jun. 3, 2025

(54) INTEGRATED LUMBAR MAT SYSTEM

(71) Applicant: Rivian IP Holdings, LLC, Plymouth, MI (US)

(72) Inventors: Thomas Flashe Young, Costa Mesa, CA (US); Thrilok Dutt Urs Puttaraje, Irvine, CA (US); Stephanie Catherine Radion, Mission Viejo, CA (US); Michael Medoro, Plymouth, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 93 days.

(21) Appl. No.: 18/131,498

(22) Filed: Apr. 6, 2023

(65) Prior Publication Data

US 2024/0336179 A1   Oct. 10, 2024

(51) Int. Cl.
| | |
|---|---|
| *B60N 2/56* | (2006.01) |
| *B60N 2/00* | (2006.01) |
| *B60N 2/66* | (2006.01) |
| *B60R 16/02* | (2006.01) |

(52) U.S. Cl.
CPC .......... *B60N 2/667* (2015.04); *B60N 2/5657* (2013.01)

(58) Field of Classification Search
CPC .... B60N 2/002; B60N 2/5657; B60N 2/5685; B60N 2/5621; B60N 2210/12; B60R 16/0215; B60R 21/01532
See application file for complete search history.

(56) References Cited

U.S. PATENT DOCUMENTS

| | | | | |
|---|---|---|---|---|
| 7,823,967 | B2* | 11/2010 | Parnis ............... | B64D 11/0624 297/180.12 |
| 9,004,589 | B2* | 4/2015 | Rockwell ............... | B60N 2/976 297/217.3 |
| 9,272,647 | B2* | 3/2016 | Gawade ............... | B60N 2/5692 |
| 9,409,496 | B2* | 8/2016 | Kordel ............... | B60N 2/0032 |
| 11,167,673 | B2* | 11/2021 | Reith ..................... | B60N 2/002 |
| 11,642,983 | B2* | 5/2023 | Ozawa .................... | B60N 2/002 297/180.12 |
| 12,005,812 | B2* | 6/2024 | Ozawa .................. | B60N 2/5825 |
| 2004/0195870 | A1* | 10/2004 | Bohlender ............... | B60N 2/56 297/180.1 |
| 2006/0175877 | A1* | 8/2006 | Alionte ................ | B60N 2/5685 297/180.14 |
| 2007/0120400 | A1* | 5/2007 | Westh ............... | B60R 21/01516 297/180.13 |
| 2008/0296942 | A1* | 12/2008 | Schweiker ........... | B60N 2/5685 297/217.3 |
| 2010/0207773 | A1* | 8/2010 | Hayakawa ........... | B60N 2/0026 340/667 |
| 2010/0244504 | A1* | 9/2010 | Colja ................... | A61H 9/0078 297/284.6 |

(Continued)

*Primary Examiner* — Shin H Kim
(74) *Attorney, Agent, or Firm* — Haley Guiliano LLP (57) ABSTRACT

An apparatus includes a frame configured to interface with a seatback of a vehicle seat, a lumbar mat configured to provide lumbar support for the vehicle seat, and a flexible element coupling the frame to the lumbar mat. Another apparatus includes a lumbar mat configured to interface to a seatback of a vehicle seat, a flexible printed circuit board (PCB) affixed to a rear side of the lumbar mat, and a cover arranged rearward of the lumbar mat and flexible PCB and configured to enclose circuitry of the flexible PCB.

18 Claims, 5 Drawing Sheets

FIG. 1

(56) References Cited

U.S. PATENT DOCUMENTS

| | | | |
|---|---|---|---|
| 2011/0163767 A1* | 7/2011 | Chen | B60R 21/01516 324/679 |
| 2013/0334844 A1* | 12/2013 | Lamesch | B60N 2/0031 297/180.12 |
| 2014/0008948 A1* | 1/2014 | Rockwell | B60N 2/976 297/217.3 |
| 2014/0246887 A1* | 9/2014 | Clos | B60N 2/7094 297/217.3 |
| 2015/0137569 A1* | 5/2015 | Goedert | B60N 2/0032 73/818 |
| 2015/0239321 A1* | 8/2015 | Muller | B60H 1/00792 297/217.2 |
| 2017/0008434 A1* | 1/2017 | Chang | B60N 2/806 |
| 2018/0154812 A1* | 6/2018 | McMillen | B60N 2/22 |
| 2018/0170222 A1* | 6/2018 | Patrick | B60N 2/914 |
| 2018/0257523 A1* | 9/2018 | Dacosta-Mallet | B60N 2/565 |
| 2020/0001812 A1* | 1/2020 | Cho | G06F 3/04817 |
| 2020/0061223 A1* | 2/2020 | Hallack | A61L 2/28 |
| 2020/0108753 A1* | 4/2020 | Fujii | B60N 2/5657 |
| 2021/0178989 A1* | 6/2021 | Yoo | B60N 2/0224 |
| 2021/0190542 A1* | 6/2021 | Wilson | H05K 1/028 |
| 2021/0245635 A1* | 8/2021 | Binner | B60N 2/20 |
| 2021/0323443 A1* | 10/2021 | Ozawa | B60R 16/0215 |
| 2023/0121196 A1* | 4/2023 | Kumar | B60N 2/5657 297/180.14 |
| 2023/0226955 A1* | 7/2023 | Ozawa | B60N 2/0033 |
| 2023/0311729 A1* | 10/2023 | Blair | B60N 2/665 |
| 2024/0067052 A1* | 2/2024 | Legh | B60N 2/0252 |
| 2024/0067055 A1* | 2/2024 | Legh | B60N 2/853 |
| 2024/0067057 A1* | 2/2024 | Meredith | B60N 2/1821 |
| 2024/0172873 A1* | 5/2024 | Ohira | B60N 2/5657 |
| 2024/0174143 A1* | 5/2024 | Schroeder | B60N 2/5621 |
| 2024/0294096 A1* | 9/2024 | Ozawa | B60N 2/5657 |

* cited by examiner

INTEGRATED LUMBAR MAT SYSTEM

INTRODUCTION

The present disclosure is directed to an integrated lumbar mat, and more particularly to an integrated lumbar mat having a module and harness for a vehicle.

SUMMARY

A vehicle may include one or more seats that include a lower section and a seatback. The lower section may include a cushion and a frame, and the seatback may include a cushion and a frame. In some embodiments, an assembly that includes a plurality of components may be assembled and then installed on the seatback. By assembling the components first, and then installing the assembly, the assembly of the seat may be streamlined. In some embodiments, the plurality of components includes a subassembly of a lumbar mat, flexible electronics and a back cover that may be tethered to a subframe using an elastic element.

In some embodiments, the present disclosure is directed to an apparatus that includes a frame configured to interface with a seatback of a vehicle seat, a lumbar mat configured to provide lumbar support for the vehicle seat, and a flexible element coupling the frame to the lumbar mat. In some embodiments, the apparatus includes a module pneumatically coupled to the lumbar mat and configured to control the lumbar mat. For example, in some embodiments, the module includes a flexible printed circuit board (PCB), and a flexible harness comprising an electrical connector. In a further example, in some embodiments, the module includes an air compressor configured to provide air to the lumbar mat, and at least one valve configured to control a flow of the air. In a further example, in some embodiments, the module includes control circuitry configured to control a property (e.g., volume, shape) of the lumbar mat. In a further example, in some embodiments, the module is electrically coupled to the lumbar mat and is configured to control the lumbar mat.

In some embodiments, the apparatus includes a heating system, a ventilation system, a pneumatic system, an infotainment system, an airbag guide, any other suitable component, or any combination thereof.

In some embodiments, the present disclosure is directed to an apparatus that includes a lumbar mat configured to interface to a seatback of a vehicle seat, a flexible printed circuit board (PCB) having a region affixed to a surface of the lumbar mat, and a cover arranged rearward of the lumbar mat and flexible PCB and configured to enclose circuitry of the flexible PCB. In some embodiments, for example, the flexible PCB includes a first region affixed to the lumbar mat, and a second region configured as a flexible harness. In some embodiments, flexible harness includes an electrical connector configured to engage with another connector coupled to a control system. In some embodiments, the cover includes one or more manifold features for directing a flow of air.

In some embodiments, the apparatus includes a pneumatic system arranged between the flexible PCB and the side cover, and the pneumatic system is pneumatically coupled to the lumbar mar. In some embodiments, the control circuitry is configured to control at least one of a pneumatic system, a ventilation system, a heating system, or an infotainment system.

In some embodiments, the present disclosure is directed to a method that includes affixing a plurality of components to a frame to form an assembly configured to interface with a vehicle seatback, interfacing the assembly to the vehicle seatback, and affixing the flexible PCB harness to a mating connector. In some embodiments, the plurality of components includes a flexible printed circuit board (PCB). In some embodiments, the method includes arranging the plurality of components relative to the frame before interfacing the halo assembly to the vehicle seatback. In some embodiments, affixing the plurality of components to the frame includes arranging a ventilation system comprising a fan relative to the frame, and arranging a module configured to control a lumbar mat relative to the frame. In some embodiments, affixing the plurality of components to the frame includes arranging an infotainment system relative to the frame. In some embodiments, affixing the plurality of components to the frame includes arranging a lumbar mat configured to interface to a seatback of a vehicle seat, arranging a flexible printed circuit board (PCB) against a rear side of the lumbar mat, and arranging a cover rearward of the flexible PCB to enclose circuitry of the flexible PCB. In some embodiments, affixing the plurality of components to the frame includes affixing a first region of the flexible PCB to the lumbar mat, and allowing a second region of the flexible PCB to move relative to the lumbar mat as a flexible harness. In some embodiments, affixing the plurality of components to the frame includes affixing a flexible element to the frame and to the lumbar mat. In some embodiments, the method includes using a common tooling to form a suitable combination of a lumbar mat, at least one flexible element, and at least one bracket. For example, affixing the plurality of components to the frame may include affixing the at least one flexible element to the frame.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

A vehicle seat may include a lumbar system to provide support to an occupant. A seat lumbar suspension and bracketry components may, in some circumstances, require time and space to assemble on an assembly line when running at high rates (e.g., throughput) and with complicated or otherwise multi-component seat designs. In some embodiments, the present disclosure is directed to techniques for assembling components of a vehicle seat (e.g., by first assembling components to form an assembly and then installing with a seat).

A vehicle may include one or more seat lumbar comfort modules (e.g., including a fan, lumbar bladder valve block, or other suitable module) that may present significant cost and mass drivers in automotive seats. In some circumstances, these components also may result in thicker seats when mounted on the back of the lumbar mat. Additionally, routing harnesses to this area can complicate internal seat packaging as well as drive additional piece and assembly costs. In some embodiments, components or the assembly may be miniaturized (e.g., to fit within a given package size). In some embodiments, the present disclosure is directed to an assembly that is architecturally thinner due to up-integration of various components.

Figure 1:
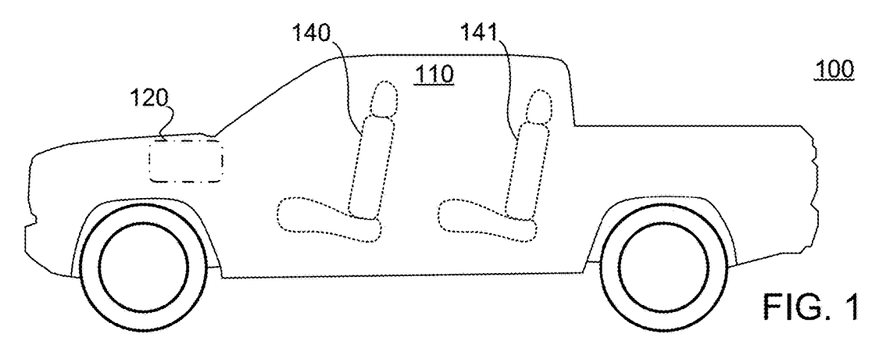
FIG. 1 shows an illustrative vehicle having at least one integrated lumbar mat, in accordance with some embodiments of the present disclosure.

FIG. 1 shows illustrative vehicle 100 having at least one integrated lumbar mat, in accordance with some embodiments of the present disclosure. As illustrated, vehicle 100 includes control system 120, and seats 140 and 141 (e.g., each including an integrated lumbar mat) arranged in occupant compartment 110, in accordance with some embodiments of the present disclosure. Control system 120 includes control circuitry that is coupled to sensors, actuators, interfaces, and any other suitable components to control one or more systems such as systems of seats 140 and 141. Control system 120 may include control circuitry for monitoring sensor signals, generating control signals, executing computer readable instructions, receiving inputs, or a combination thereof. In some embodiments, seats 140 and 141 include a pneumatic system such as, for example, a valve block for controlling air flow and/or pressure for inflating or deflating bladders to provide lumbar support. In an illustrative example, each of seats 140 and 141 may include a halo system (e.g., installed around and behind a seat cushion) that includes sensors, ports (e.g., a USB port), infotainment systems, harnesses, connectors, a fan, valves (e.g., for controlling pneumatics), an airbag guide, a lumbar mat, a link coupling the lumbar mat to a frame, any other suitable components or systems, or any suitable combinations thereof.

Figure 2:
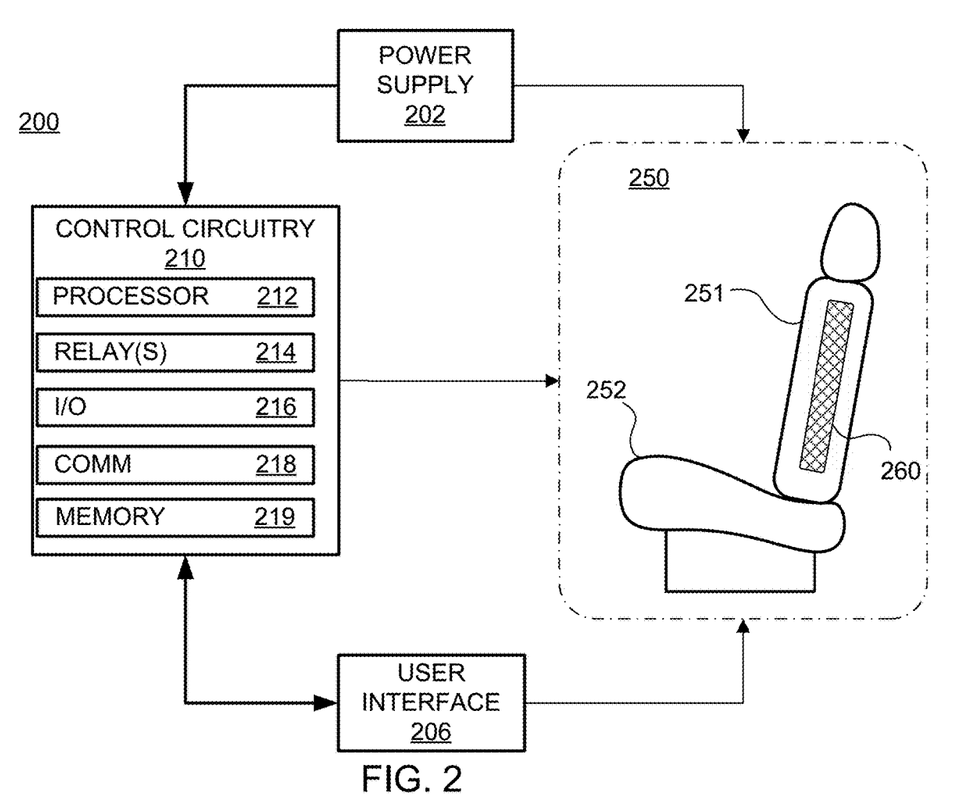
FIG. 2 is a block diagram of an illustrative vehicle having an integrated lumbar mat system, in accordance with some embodiments of the present disclosure.

FIG. 2 is a block diagram of illustrative vehicle system 200 having integrated lumbar mat system 260, in accordance with some embodiments of the present disclosure. As illustrated, vehicle system 200 includes control circuitry 210, power supply 202, user interface 206, and seat 250 (e.g., a vehicle seat). In some embodiments, control circuitry 210 may be included as part of a vehicle controller, electronic control unit (ECU), or may be a standalone controller configured to control aspects of seat 250. As illustrated, control circuitry 210 includes processor 212, one or more relays 214, input/output interface (I/O) 216, communications interface (comm) 218, and memory 219 (e.g., non-transitory computer-readable media for storing executable instructions). Control circuitry 210 may include, for example, a processor, a communications bus, memory, power management circuitry, a power supply, any suitable components, or any combination thereof. Memory 219 may include solid state memory, a hard disk, removable media, any other suitable memory hardware, or any combination thereof. In some embodiments, memory 219 is configured to store computer instructions that, when executed, perform process 900 described in the context of FIG. 9. Comm 218 may include one or more ports, connectors, input/output (I/O) terminals, cables, wires, a printed circuit board, control circuitry, any other suitable components for communicating with other units, devices, or components, or any combination thereof.

Seat 250 includes base 252 (e.g., a first section) and seatback 251 (e.g., a second section). Each of base 252 and seatback 251 may include one or more components such as, for example, a respective frame, cushion, sensors, circuitry, mounting features (e.g., to mount to each other or to a floor of an occupant compartment), seatbelts and corresponding hardware, any other suitable components, or any combination thereof. As illustrated, integrated lumbar mat system 260 is integrated with seatback 251. Integrated lumbar mat system 260 may include a plurality of components, which may be sourced from different manufacturers, that are pre-assembled together to form a subassembly. The subassembly (e.g., integrated lumbar mat system 260) is then integrated with the rest of seatback 251. The subassembly may include, for example, a lumbar mat system (e.g., a lumbar mat, elastic link, control circuitry, and a harness), a ventilation system (e.g., including a fan, ducting, vanes, baffles, guides, or a combination thereof), actuators (e.g., linear actuators, pneumatic actuators, rotary actuators, or any other suitable actuators for applying force and/or causing displacement), electronics (e.g., speakers, microphones, comm ports such as USB, a display screen or touch screen, flexible circuit boards, control circuitry for controlling actuators, and/or any other electronic components), any other suitable system, subsystem, or component, or any combination thereof. For example, integrated lumbar mat system 260 may include a "halo structure" having a frame extending around all or part of the periphery, with a lumbar mat arranged in the center (e.g., within the "halo") and components arranged along the frame and secured with fasteners, adhesives, and/or brackets. In a further example, the frame may include integrated brackets, airbag guides, ducts for airflow, wiring and harnesses, and features for mounting to the rest of seatback 251, base 252 (e.g., after the subassembly is affixed as part of seatback 251), any other suitable components, or any combination thereof. In an illustrative example, I/O 216 may include a harness and connector configured to interface to a harness and connector of seat 250 (e.g., integrated lumbar mat system 260 thereof). In a further illustrative example, comm 218 may be coupled to seat 250 (e.g., integrated lumbar mat system 260 thereof) to provide communications to a system of seat 250 (e.g., to provide data and/or commands to an infotainment system, ventilation system, actuator system, pneumatic system, or any other suitable system).

User interface 206 may include a touchscreen, dial, knob, switch, slider, microphone, any other suitable input device or output device, or any combination thereof. For example, a user may input one or more commands, targets (e.g., a desired temperature, seat position, lumbar mat configuration, infotainment setting), or preferences to adjust or otherwise control one or more systems of the vehicle. Power supply 202 may include a battery, DC-DC converter, DC-AC converter, power electronics, any other suitable components, or any combination thereof to provide power to control circuitry 210, components of seat 250, and any other suitable systems of vehicle system 200 (e.g., not illustrated in FIG. 2).

Figure 3:
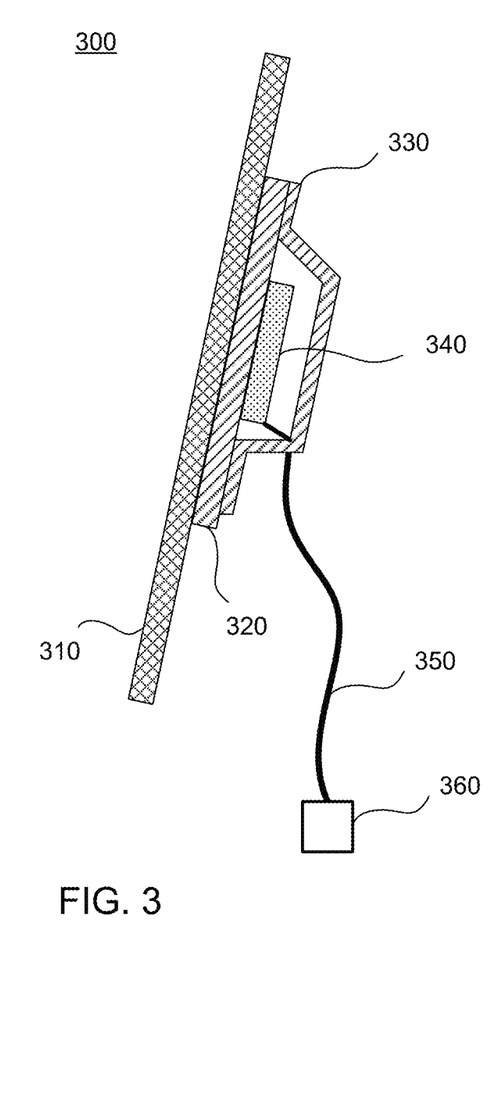
FIG. 3 shows an illustrative lumbar system of a vehicle, in accordance with some embodiments of the present disclosure.

FIG. 3 shows illustrative lumbar system 300 of a vehicle, in accordance with some embodiments of the present disclosure. As illustrated, lumbar system 300 includes lumbar mat 310, covers 320 and 330 (e.g., may be separate covers or integrated together as a single cover), circuitry 340 (e.g., a rigid or flexible printed circuit board), harness 350 electrically coupled to circuitry 340, and connector 360 for interfacing harness 350 to further electronics (e.g., control circuitry 210 of FIG. 2). As illustrated, harness 350 may be separate from circuitry 340

Figure 4:
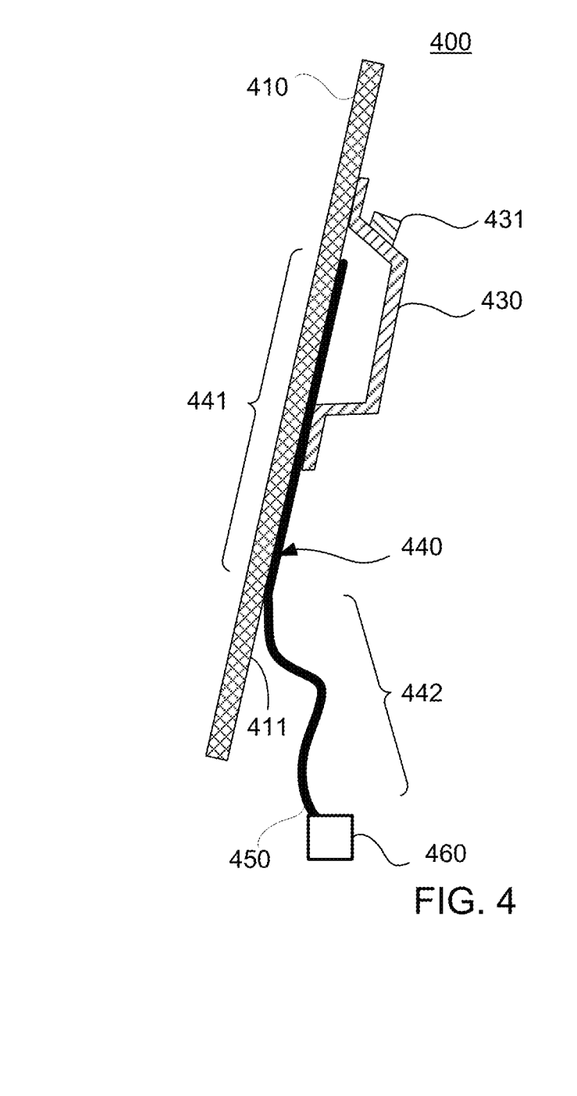
FIG. 4 shows an illustrative integrated lumbar mat system of a vehicle, in accordance with some embodiments of the present disclosure.

FIG. 4 shows illustrative integrated lumbar mat system 400 of a vehicle, in accordance with some embodiments of the present disclosure. As illustrated, integrated lumbar mat system 400 includes lumbar mat 410, cover 430 (also referred to as a "side cover"), circuitry 440 (e.g., a flexible printed circuit board), harness 450 electrically coupled to circuitry 440, and connector 460 for interfacing harness 450 to further electronics (e.g., control circuitry 210 of FIG. 2). Circuitry 440 includes regions 441 (e.g., a first region) and 442 (e.g., a second region), in which region 441 is configured to be affixed to lumbar mat 410 and region 442 is configured to be allowed to move as a harness relative to lumbar mat 410 (e.g., is not affixed to lumbar mat 410). For example, region 442 is configured to move relative to the rear side of lumbar mat 410 To illustrate, electronics components may be populated among a first portion of circuitry 440 corresponding to region 441, and the first portion may be affixed to lumbar mat 410 (e.g., to maintain the arrangement of components), while region 442 may correspond to a portion of circuitry 440 having relatively fewer components or no components (e.g., only conductive traces, wires, or other electronic conductors). To illustrate, region 441 of a flexible PCB (e.g., circuitry 440) is affixed to surface 411 of lumbar mat 410. As compared to lumbar system 300, integrated lumbar mat system 400 includes a flexible circuit (e.g., circuitry 440) affixed to the lumbar mat (e.g., lumbar mat 410) with a simplified cover (e.g., cover 430). In some embodiments, as illustrated, cover 430 includes one or more manifold features 431 for directing a flow of air. For example, a module formed by circuitry 440 and cover 430 may include a fan, pneumatic components, and ducting for providing air to a seat. Manifold features 431 may include ducting, ports, volumes, vents, any other suitable features for directing or partitioning air, or any combination thereof. A lumbar mat (e.g., lumbar mat 310 or 410) may be formed from, or otherwise include, injection molded plastic with suitable properties for including a vehicle seat (e.g., to meet load requirements). The material may include, for example, polypropylene (PP), glass-filled (GF) plastics, acrylonitrile butadiene styrene (ABS), any other suitable plastics, or any combination thereof. In some embodiments, an interface material may include an adhesive (e.g., a pressure-sensitive adhesive) to affix a lumbar mat (e.g., lumbar mat 310 or 410) to a flexible circuit (e.g., circuitry 440) or housing (e.g., cover 320). In some embodiments, an interface may include one or more fasteners (e.g., such as push pins, screws, or other suitable fasteners) to affix a lumbar mat (e.g., lumbar mat 310 or 410) to a flexible circuit (e.g., circuitry 440) or housing (e.g., cover 320).

In an illustrative example, forming integrated lumbar mat system 400 may include up-integrating part of a lumbar shape memory allow (SMA) module cover into the lumbar mat itself (e.g., lumbar mat 410, wherein cover 320 is not needed or otherwise not included). In some embodiments, this up-integration may also be used for a seatback ventilation fan and/or any other suitable modules mounted in this area (e.g., to a "halo" subassembly of the seatback). In some embodiments, a rigid PCB may be used. In some embodiments, a flex circuit (e.g., region 441 of circuitry 440) is adhered to the back of the lumbar mat (e.g., lumbar mat 410), optionally to replace a rigid PCB or otherwise provide a more compact design having flexibility. In some embodiments, the flex circuit also functions as a harness to connect lumbar commodities (e.g., components of the "halo" assembly) to the rest of the seat harness in the non-adhered areas (e.g., connector 460 may mate to a connector of a seat base, or a connector coupled directly to control circuitry 210). To illustrate, in some circumstances, by up-integrating these components, significant package advantages may be realized (e.g., compactness, flexibility, reduced connection points), as well as reduced assembly costs due to up-integrated parts in a pre-assembled configuration.

In an illustrative example, the systems of the present disclosure (e.g., such as integrated lumbar mat system 400) may allow omission or removal of a cover (e.g., cover 320 of FIG. 3) from the stack of items on the back of the lumbar mat (e.g., as part of the "halo" assembly), resulting in less parts needing to be tooled up (e.g., by utilizing a flex circuit to perform the functions of a PCB in the module and a harness). To illustrate, the integrated lumbar system may be package and automation friendly, having fewer overall parts to achieve the same functionality. To illustrate further, integrated lumbar mat system 400 may allow a lesser material cost, lesser assembly cost (e.g., labor), lesser mass and/or volume, improved reliability via reduced part count, improved seatback packaging, or a combination thereof.

Figure 5:
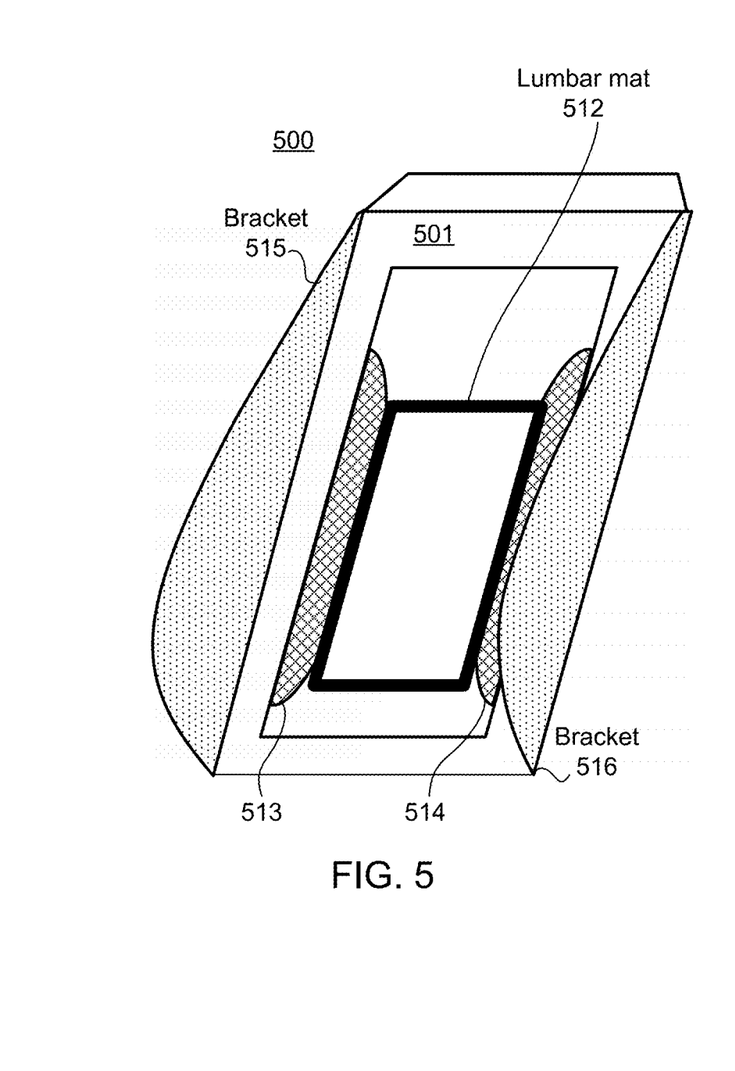
FIG. 5 shows a perspective view of an illustrative seatback having an integrated lumbar mat system, in accordance with some embodiments of the present disclosure.

FIG. 5 shows a perspective view of illustrative seatback 500 having an integrated lumbar mat system (e.g., including lumbar mat 512), in accordance with some embodiments of the present disclosure. Seatback 500 may be included as part of seat 250 of FIG. 2 (e.g., seat element of seat 250 thereof), or seats 140 and 141 of vehicle 100 of FIG. 1, for example. As illustrated, seatback 500 includes frame 501, brackets 515 and 516, flexible elements 513 and 514, and lumbar mat 512. To illustrate, an assembly (e.g., seatback 500) may include airbag guides (e.g., of brackets 515 and 516), upper back supports (e.g., of frame 501), a seat back lumbar mat (e.g., lumbar mat 512), and a seat lumbar suspension system (e.g., including elastic elements such as flexible elements 513 and 514) that are integrated into a single component that can be more easily and/or quickly assembled with a seat frame. Flexible elements 513 and 514 may include, for example, elastic fabric, mesh, springs, over-molding, any other suitable flexible elements, or any combination thereof. In some embodiments, flexible elements 513 and 514 are each attached along at least one side of frame 501, and are each also attached to lumbar mat 512. For example, because flexible elements 513 and 514 provide compliance and a restoring force (e.g., based on displacement), lumbar mat 512 can change shape, position, orientation, or a combination thereof while still being tethered to frame 501. Flexible elements 513 and 514 may each include an elastic cloth, for example, to function as a springy or spring-like suspension element to couple a halo system (e.g., frame 501 with brackets 515 and 516) with a lumbar mat (e.g., lumbar mat 512). For example, flexible elements 513 and 514 may be co-molded using the same tool or tooling as lumbar mat 512, brackets 515 and 516, or any other suitable components of a seat system. In a further example, flexible elements 513 and 514 may include spring elements (e.g., metallic coil springs or metal elements having suitable stiffness/deflection characteristics) that impart a force on lumbar mat 512 (e.g., edges or connection points thereof) to maintain an arrangement of lumbar mat 512, counteract disturbances (e.g., shifting position of, or adjustment by, an occupant), or both. In some embodiments, brackets 515 and 516 are multi-functioned, and may be configured as airbag guides, mounts for accessories, framing or structural support, vent guides for airflow or ventilation, any other suitable function, or any combination thereof.

Figure 6:
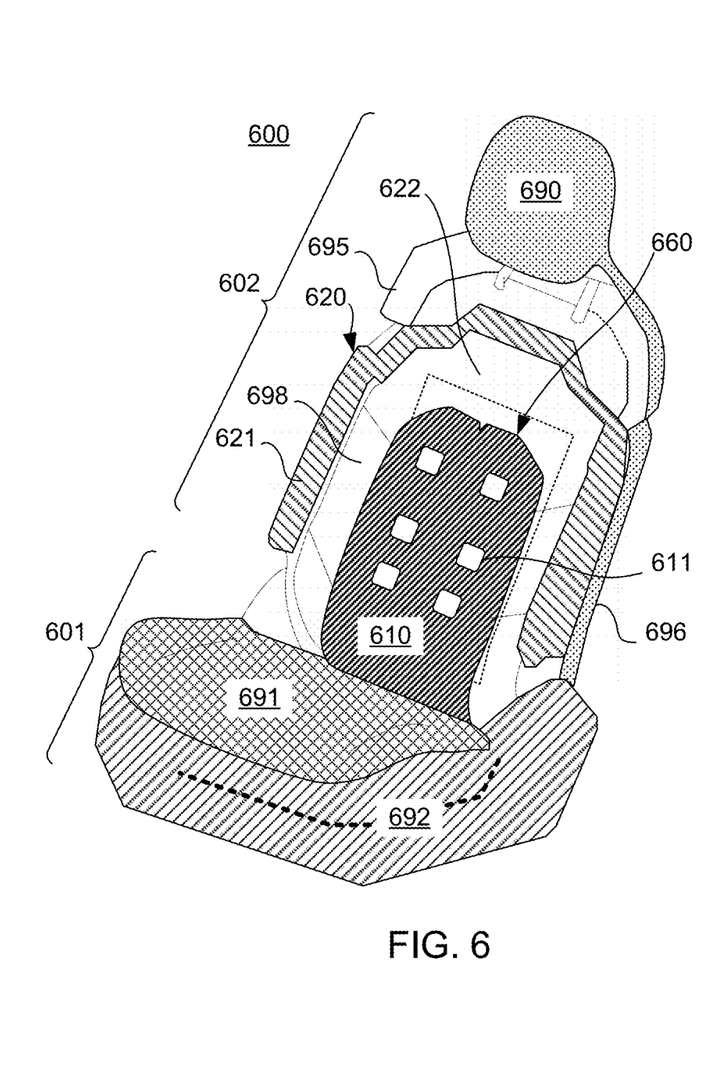
FIG. 6 shows a perspective view of an illustrative vehicle seat having an integrated lumbar mat system, in accordance with some embodiments of the present disclosure.

FIG. 6 shows a perspective view of an illustrative vehicle seat (seat 600) having an integrated lumbar mat system 660, in accordance with some embodiments of the present disclosure. As illustrated, seat 600 includes lower section 601 and upper section 602 (e.g., a seatback). Lower section 601 includes cushion 691, base 692 (e.g., which may be configured to be mounted to a cabin floor), and optionally may include an occupancy sensor, seatbelt hardware, seat warmer, any other suitable components, or any combination thereof. Upper section 602 includes headrest 690, a cushion (not illustrated in FIG. 6), subassembly 620 (e.g., a halo), and frame 696. Subassembly 620, as illustrated, includes lumbar mat 610 (e.g., with air vents 611), tethered to frame 621 via elastic link 698. Frame 621 may include airbag guides, brackets, or other components, or the components may be integrated into frame 621. To illustrate, in some embodiments, subassembly 620 may include airbag guides, upper back supports, a seatback lumbar mat (e.g., lumbar mat 610), and the seat lumbar suspension (e.g., elastic links 698) into one component that can be quickly assembled to the seat frame (e.g., frame 696) by an operator. For example, elastic link 698 may include an elastic cloth as a spring-like suspension element to connect an outer multifunction bracket (e.g., frame 621 or "halo") with the lumbar mat (e.g., lumbar mat 610). In some embodiments, elastic link 698 may include a cloth that may be co-molded in the same tool as the lumbar mat and halo bracketry. In some embodiments, elastic link 698 may include one or more springs or springs elements. In some embodiments, subassembly 620 may be configured to up-integrate the lumbar suspension, mat, and suspension attachment into one element (e.g., which may reduce buzz-squeak-rattle (BSR) issues and may lead to a more comfortable seat). In some embodiments, subassembly 620 may include other components 622, which may include any suitable systems or components.

Figure 7:
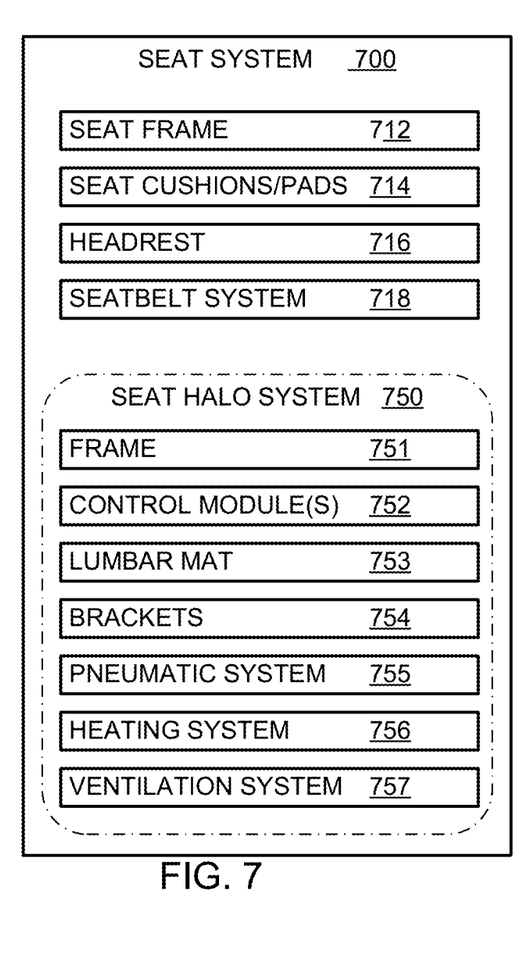
FIG. 7 is a block diagram of an illustrative seat system, in accordance with some embodiments of the present disclosure.

FIG. 7 is a block diagram of illustrative seat system 700, in accordance with some embodiments of the present disclosure. As illustrated, seat system 700 includes seat frame 712, seat cushion/pads 714, headrest 716, seatbelt system 718, and seat halo system 750. Further, as illustrated, seat halo system 750 includes frame 751, one or more control modules 752, lumbar mat 753 (e.g., an any suitable links such as elastic links), brackets 754, pneumatic system 755, heating system 756, ventilation system 757, and optionally any other suitable system or components (not illustrated), or any combination thereof. It will be understood that the components of FIG. 7 may be combined, integrated, partitioned, or otherwise modified in any suitable manner, in accordance with the present disclosure. Seat halo system 750 may pre-assembled to form a subassembly of various systems, and then the subassembly may be installed with the rest of a seatback to form a vehicle seat. In some embodiments, pneumatic system 755 is arranged between a flexible PCB (e.g., control module 752) and a cover (e.g., cover 430). In some embodiments, pneumatic system 755 is pneumatically coupled to lumbar mat 753 by one or more conduits (e.g., flexible hoses or tubing, and fittings), and also physically coupled to lumbar mat 753 (e.g., adhered to or otherwise affixed to). In some embodiments, control module 752 includes control circuitry configured to control a property (e.g., volume, shape) of lumbar mat 753. In a further example, in some embodiments, a module (e.g., control module 752) is electrically coupled to lumbar mat 753 and is configured to control lumbar mat 753. In an illustrative example, in some embodiments, seat halo system 750 may include integrated lumbar mat system 400, and have a control module 752 formed by circuitry 440 and cover 430. In some embodiments, control module 752 includes an air compressor configured to provide air to lumbar mat 753, and at least one valve configured to control a flow of the air (e.g., which may be included as part of pneumatic system 755).

Figure 8:
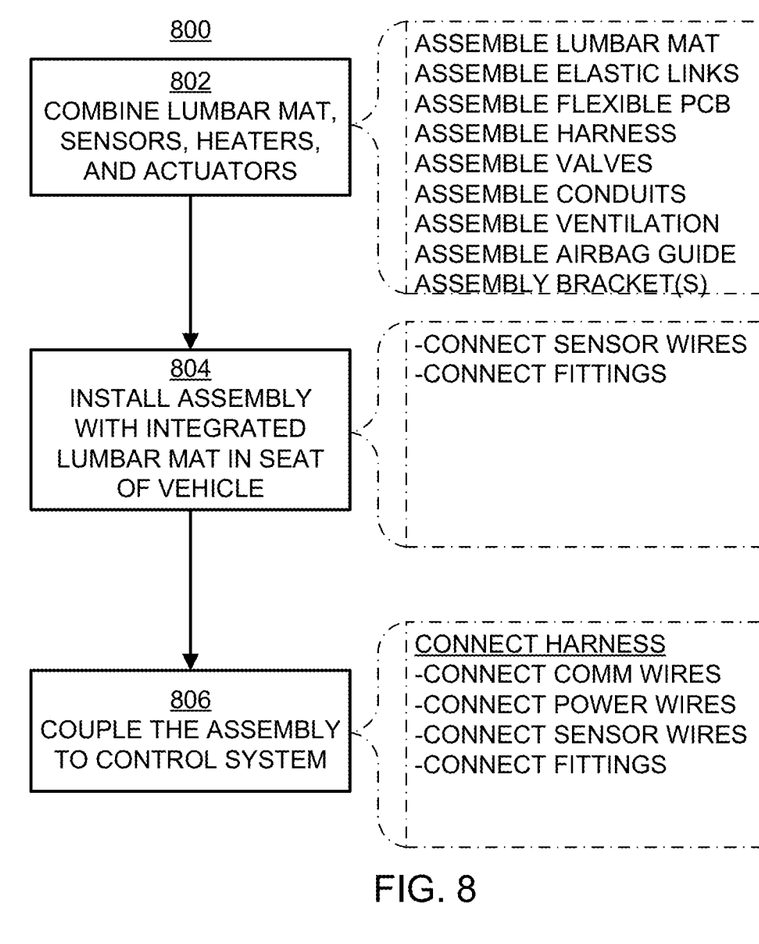
FIG. 8 is a flowchart of an illustrative process for forming a seat system, in accordance with some embodiments of the present disclosure.

FIG. 8 is a flowchart of illustrative process 800 for forming a seat system, in accordance with some embodiments of the present disclosure. For example, process 800 may be implemented to form any of the seat assemblies of the present disclosure such as seats 140 and 141 of FIG. 1, seat 250 of FIG. 2, seat 600 of FIG. 6, seat system 700 of FIG. 7, or the subassemblies of FIGS. 3-5.

Step 802 includes combining any or all of a lumbar mat, sensors, heaters, actuators, fans, pneumatic modules, valves, brackets, and any other suitable components. Step 802 may include, for example, assembling a lumbar mat, assembling one or more elastic links, assembling a flexible PCB, assembling a harness, assembling one or more valves, assembling one or more conduits, assembling a ventilation subsystem, assembling an airbag guide, assembling one or more brackets, assembling any other suitable component or subsystem, or any combination thereof. In some embodiments, step 802 includes affixing a plurality of components to a frame configured to interface with a vehicle seatback. For example, the plurality of components may include a flexible printed circuit board (PCB), which may be tethered to a frame using one or more elastic links (e.g., including an elastic fabric). In some embodiments, step 802 includes arranging a ventilation system, which includes a fan, relative to the frame, and also arranging a module configured to control a lumbar mat relative to the frame. In some embodiments, step 802 includes arranging an infotainment system relative to the frame. For example, the infotainment system may include a screen (e.g., a touchscreen), control circuitry, one or more ports (e.g., a USB port, an HDMI port, an RCA port, any other suitable port, or any combination thereof), a battery, a speaker, a microphone, one more buttons or knobs, one or more wireless transceivers, a communications link to a console system, any other suitable components, or any combination thereof. In some embodiments, step 802 includes arranging a lumbar mat configured to interface to a seatback of a vehicle seat, arranging a flexible printed circuit board (PCB) against a rear side of the lumbar mat, and arranging a cover rearward of the flexible PCB to enclose circuitry of the flexible PCB (e.g., as illustrated in FIG. 4). In some embodiments, step 802 includes affixing a first region of the flexible PCB to the lumbar mat, and allowing a second region of the flexible PCB to move relative to the lumbar mat as a flexible harness (e.g., not affixing the second region to the lumbar mat). In some embodiments, step 802 includes affixing a flexible element to the frame and to the lumbar mat such that the lumbar mat can shift, move, or change in shape. In some embodiments, step 802 includes installing a module pneumatically coupled to the lumbar mat and configured to control the lumbar mat (e.g., affixing the module or module cover to a flexible PCB and/or the lumbar mat). In some embodiments, step 802 includes using a common tooling to form a lumbar mat and at least one flexible element, and optionally one or more brackets. For example, step 802 may include affixing a plurality of components to a frame by affixing at least one flexible element, and optionally one or more brackets, to the frame such that the lumbar mat is coupled to the frame.

Step 804 includes installing the assembly of step 802, including an integrated lumbar mat, in a seat of a vehicle. For example, the assembly of step 802 may be referred to as a "halo" or "super halo" that includes a plurality of components and is configured to be affixed to a seat (e.g., a seatback thereof) to provide corresponding functionality (e.g., corresponding to the plurality of components). As illustrated in FIGS. 5-6, for example, at step 804 the assembly may be bolted to a seat frame, to a seat base, or otherwise to any suitable portion of a vehicle seat. Step 804 may include adhering the assembly (e.g., using one or more adhesives), fastening the assembly (e.g., using threaded fasteners such as screws), clipping the assembly (e.g., using one or more mating mechanical features such as lips, tabs, steps, slots, flex joints, or any other suitable features), crimping features of the assembly (e.g., tabs), applying any other suitable affixment, or applying any combination thereof. In some embodiments, step 804 includes interfacing the halo assembly to the vehicle seatback at a suitable interface by arranging the halo assembly relative to the seatback and then affixing the halo assembly to the seatback. The halo assembly may include a first side, a second side, and a top section that couples the first and second sides to form a three-sided structure or approximately a three-sided structure (e.g., as illustrated in FIG. 6). In some embodiments, the halo assembly may include a first side and a second side, along with a top side and a bottom side that couple the first and second sides to form a four-sided structure or approximately a four-sided structure (e.g., as illustrated in FIG. 5).

Step 806 includes coupling the assembly to a control system. In some embodiments, step 806 includes affixing a flexible PCB harness (e.g., having at least one connector) to a mating connector (e.g., plugging one connector into the other connector). For example, step 806 may include connecting communications wires (e.g., harness and connectors), power wires (e.g., harness and connectors), sensor wires (e.g., harness and connectors), fittings (e.g., tube, hosing, pipe fittings acting as conduits for air, coolant, or other fluid). Step 806 may include, for example, connecting a connector of a flexible PCB to a connector a seat base or other suitable connector coupled to control circuitry 210 of FIG. 2.

Figure 9:
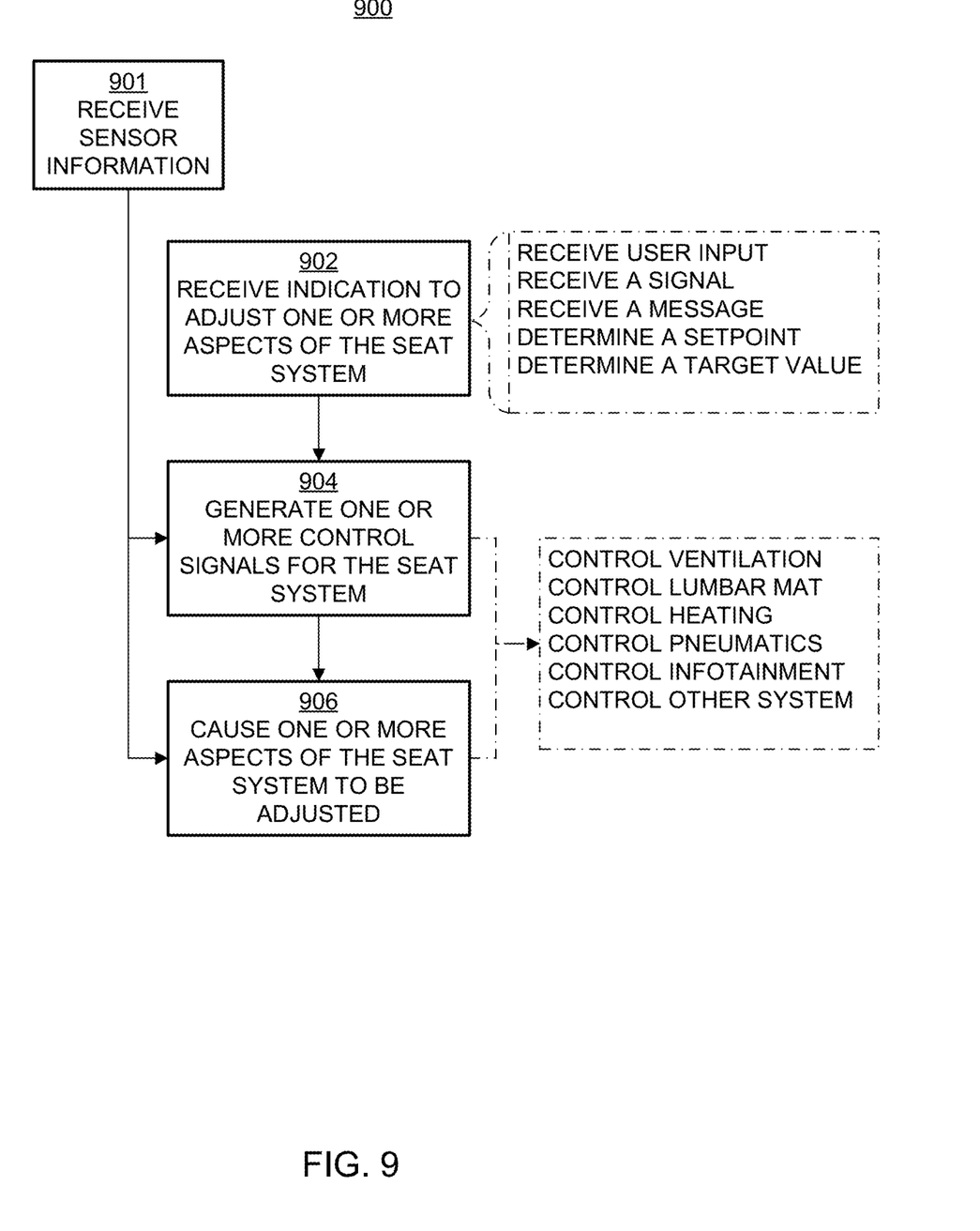
FIG. 9 is a flowchart of an illustrative process for using a seat system, in accordance with some embodiments of the present disclosure.

FIG. 9 is a flowchart of illustrative process 900 for using a seat system, in accordance with some embodiments of the present disclosure. To illustrate, process 900 may be implemented using control system 120 of FIG. 1 to control aspects of seats 140 and 141, control circuitry 210 of FIG. 2 to control aspects of seat 250 (e.g., based on instructions stored in memory 219), control circuitry to control lumbar system 300 or integrated lumbar mat system 400 of FIGS. 3-4, control circuitry to control seatback 500 of FIG. 5, or control circuitry to control seat 600 of FIG. 6.

Step 902 includes the system receiving an indication to adjust one or more aspects of the seat system. In some embodiments, step 902 includes receiving user input, one or more signals, one or more message, one or more setpoints or target values, any other suitable inputs, or any combination thereof. Step 901 includes the system receiving sensor information from one or more sensors directly, or from control circuitry configured to process sensor signals. The sensor signals may be provided by suitable sensors that may include current sensors, voltage sensors, occupancy sensors, temperature sensors, airflow sensors, displacement sensors (e.g., encoders), pressure sensors, any other suitable sensors, or any combination thereof.

Step 904 includes the system generating one or more control signals for the seat system. In some embodiments, the one or more control signals are based on the received indication at step 902, sensor information of step 901, or a combination thereof. The one or more control signals of step 904 may include signals to control ventilation, a lumbar mat, heating, pneumatics, infotainment, any other suitable system, or any combination thereof. Step 906 includes the system causing one or more aspects of the seat system to be adjusted. In some embodiments, the one or more aspects is adjusted based on the one or more control signals of step 904. For example, when the one or more control signals are received at the corresponding component of the halo system, the signal may cause the component to change one or more aspects of the halo system. For example, the control signal may cause a change in airflow, temperature, lumbar mat shape, or otherwise cause data to be presented using an infotainment system.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An apparatus comprising:
a lumbar mat configured to interface to a seatback of a vehicle seat;
a flexible printed circuit board (PCB) including a first region affixed to a rear side of the lumbar mat and a second region configured to move relative to the rear side of the lumbar mat; and
a cover arranged rearward of the lumbar mat and flexible PCB and configured to enclose circuitry of the flexible PCB, wherein the cover comprises one or more manifold features to direct a flow of air.

2. The apparatus of claim 1, wherein:
the first region of the flexible PCB is affixed to a surface of the lumbar mat; and
the second region of the PCB is configured as a flexible harness.

3. The apparatus of claim 2, wherein the second region of the flexible PCB comprises an electrical connector configured to engage with another connector coupled to a control system.

4. The apparatus of claim 1, further comprising a pneumatic system arranged between the flexible PCB and the cover.

5. The apparatus of claim 1, wherein the circuitry is configured to control at least one of a pneumatic system, a ventilation system, a heating system, or an infotainment system.

6. An apparatus comprising:
a frame configured to interface with a seatback of a vehicle seat, wherein the frame comprises a periphery and a center;
a lumbar mat configured to provide lumbar support for the vehicle seat; and
a flexible element attached to the periphery of the frame and to the lumbar mat to maintain an arrangement of the lumbar mat in the center.

7. The apparatus of claim 6, further comprising a module pneumatically coupled to the lumbar mat and configured to control the lumbar mat.

8. The apparatus of claim 7, wherein the module comprises:
a flexible printed circuit board (PCB); and
a flexible harness comprising an electrical connector.

9. The apparatus of claim 7, wherein the module comprises:
an air compressor configured to provide air to the lumbar mat; and
at least one valve configured to control a flow of the air.

10. The apparatus of claim 7, wherein the module comprises control circuitry configured to control a property of the lumbar mat.

11. The apparatus of claim 6, further comprising a module electrically coupled to the lumbar mat and configured to control the lumbar mat.

12. The apparatus of claim 6, further comprising:
a heating system;
a ventilation system;
a pneumatic system; or
an infotainment system; or
a combination thereof.

13. A method comprising:
affixing a plurality of components to a frame to form an assembly configured to interface with a vehicle seatback, wherein the plurality of components comprises:
a flexible printed circuit board (PCB);
a ventilation system comprising a fan; and
a module configured to control a lumbar mat; and
interfacing the assembly to the vehicle seatback.

14. The method of claim 13, further comprising arranging the plurality of components relative to the frame before interfacing the assembly to the vehicle seatback.

15. The method of claim 13, further comprising using a common tooling to form the lumbar mat and at least one flexible element, wherein affixing the plurality of components to the frame comprises affixing the at least one flexible element to the frame.

16. The method of claim 13, wherein affixing the plurality of components to the frame comprises:
arranging the lumbar mat;
arranging the flexible PCB against a rear side of the lumbar mat; and
arranging a cover rearward of the flexible PCB to enclose circuitry of the flexible PCB.

17. The method of claim 13, wherein affixing the plurality of components to the frame comprises:
affixing a first region of the flexible PCB to the lumbar mat; and
allowing a second region of the flexible PCB to move relative to the lumbar mat as a flexible harness.

18. The method of claim 13, wherein affixing the plurality of components to the frame comprises affixing a flexible element to the frame and to the lumbar mat.

* * * * *